United States Patent Office 3,091,802
Patented June 4, 1963

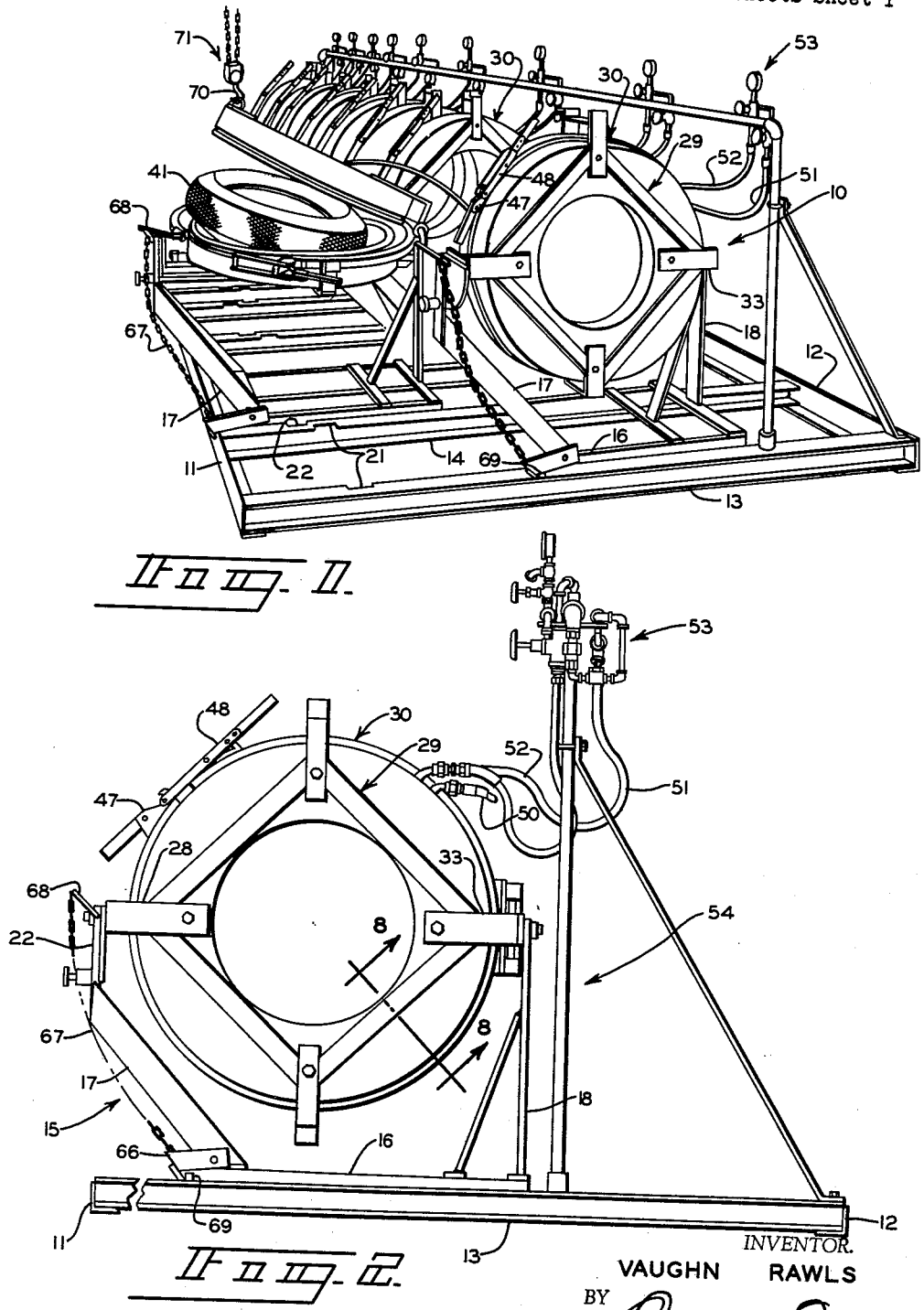

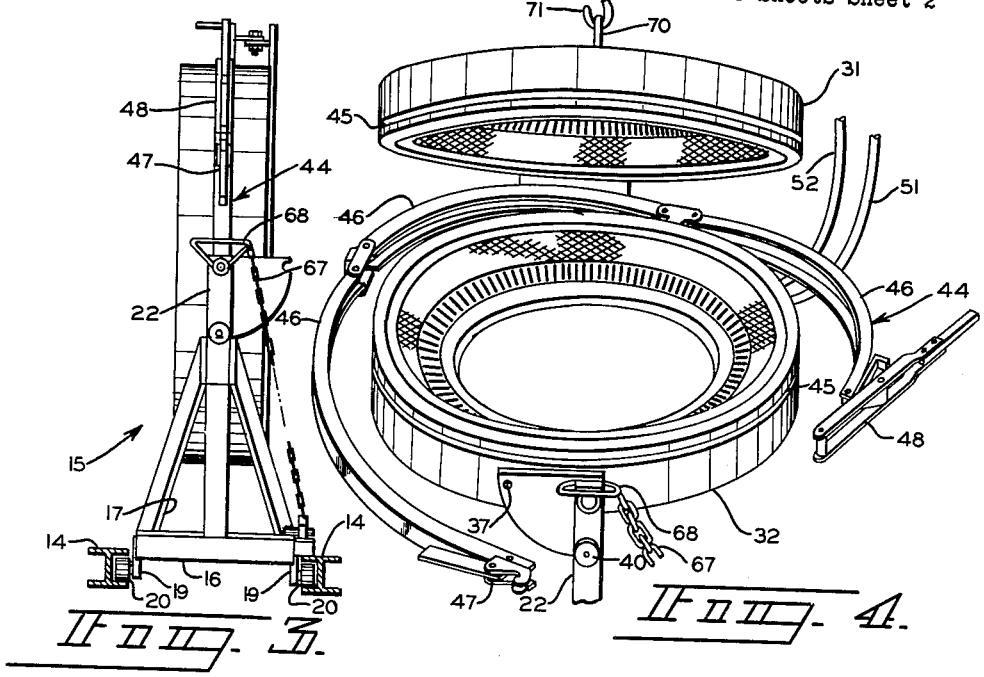
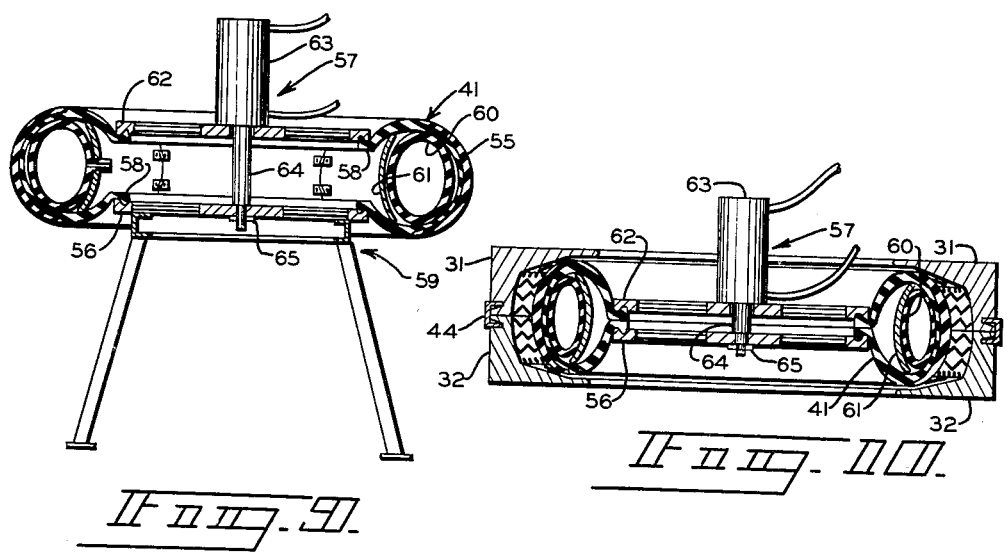

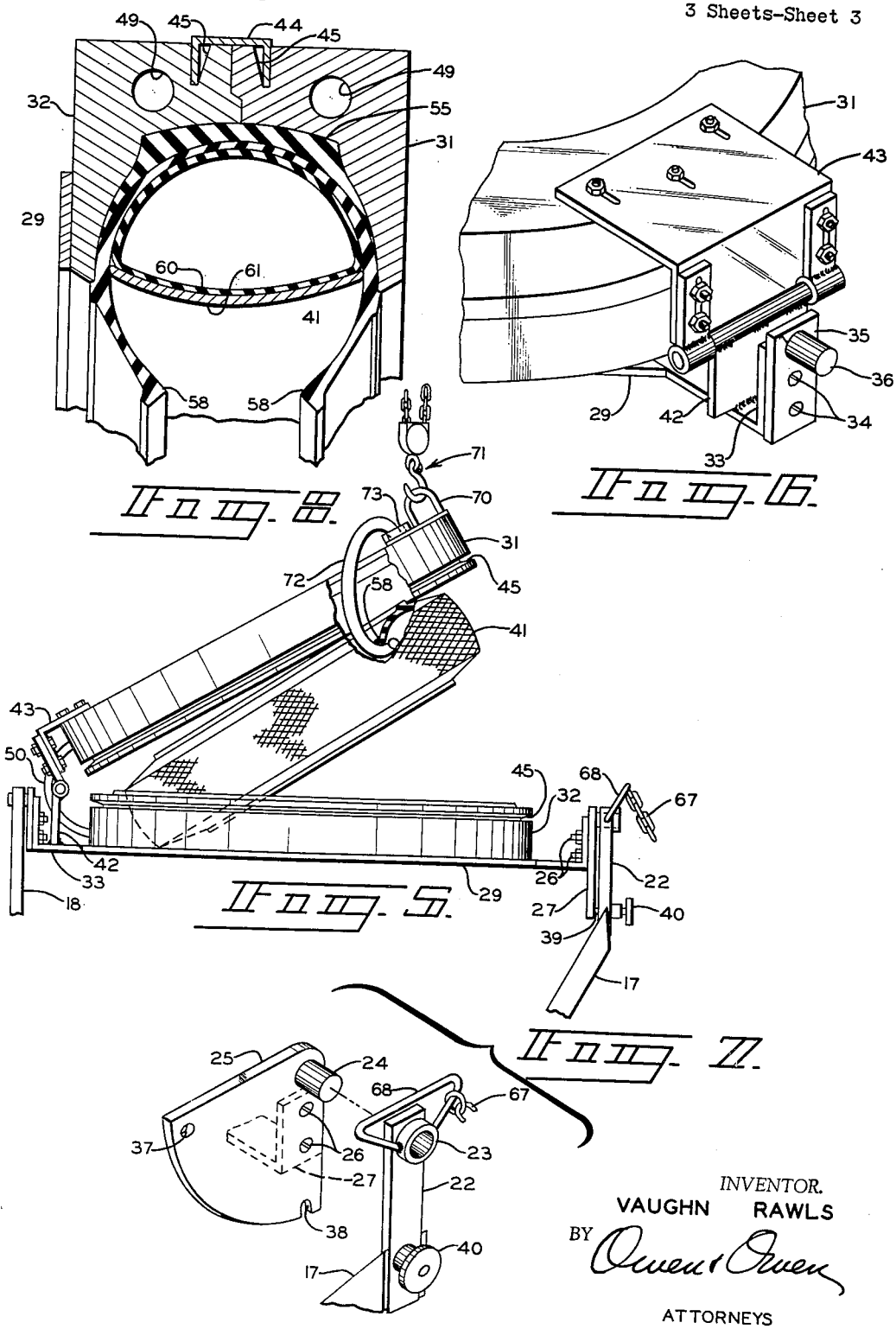

3,091,802
MULTIPLE PNEUMATIC TIRE RETREADING STATION
Vaughn Rawls, Lima, Ohio, assignor to The Rawls Brothers Company, Lima, Ohio, a corporation of Ohio
Filed June 5, 1961, Ser. No. 114,887
3 Claims. (Cl. 18—2)

This invention relates to a multiple pneumatic tire retreading station or curing station suitable for use in a pneumatic tire retreading shop and particularly to the arrangement of the mechanisms whereby the tread forming matrices are handled during loading and unloading of the tires therefrom and during the period of curing of the retread rubber on the tires.

The retreading of pneumatic tire casings involves the removal of old tread rubber from an otherwise sound casing, the adhesion to the tread areas of the casing of uncured tread rubber, called "camel-back," the mounting of a tire having an appropriate quantity of rubber on its tread areas in a suitable tire tread mold, which comprises a pair of cooperating tread matrices, and the curing of the tread forming rubber under controlled conditions of heat and pressure for a controlled period of time. In order to operate on a commercially feasible basis, each retreading shop must have a considerable number of molds in which the loaded matrices can be held during a period of say fifty to sixty minutes while the new tread rubber is being cured. Because the time required for loading or unloading the mold is only a few minutes, it means that each tire mold and pair of matrices is unavailable for loading or unloading for, say, some ninety percent of each molding cycle.

Many types of commercially available tire curing molds are stationary and are arranged with their matrices mounted for opening in the manner of a clam shell so that after they are closed around the tire to be retreaded, the tire mold continues to occupy the same amount of floor space as it does during the short period of time when it is necessary that it be opened either to insert or remove a tire therefrom. A plurality of such tire molds therefore occupies a very large amount of floor space, even though the necessity for their being positioned in such a manner exists during only a short period of a tire retreading cycle.

It is the principal object of the instant invention to provide a multiple curing station for retreading pneumatic tires in which each of the molds is movable between two positions, the first being the usual, generally horizontal, arrangement in which the matrices may be separated for inserting or removing tires and the second being a position in which the mold containing a tire is swung into generally vertical relationship so that it occupies a great deal less floor space during the fifty or fifty-five minutes of each approximately one hour long cycle.

It is a further object of the instant invention to provide a multiple tire curing station in which a plurality of tire molds, each comprising a pair of tread forming matrices, are mounted on individual carriages which are readily movable between two alternate positions, in the first position the mold lying generally horizontal so that it can be opened for the insertion or removal of a tire and the mold occupying space determined by the outside diameter of the tire and the mold whereas in the second position all of the molds on their carriages are arranged in close side-by-side array with the molds arranged generally vertically so that each occupies a floor space measured primarly by its thickness, i.e., the axial dimension of the tire plus the matrices. Since the outside diameter measured across the tire and the mold is substantially greater than the thickness of the tire and the matrices measured axially of the tire, each of the molds occupies but a small fraction of the space during the curing portion of the cycle which the same equipment occupies during the relatively short period of time which provides for insertion or removal of the tire.

These and other more specific objects and advantages will be better understood from the specification which follows and from the drawings in which:

FIG. 1 is a simplified view in perspective of a multiple curing station for retreading pneumatic tires and which embodies the invention;

FIG. 2 is a view in side elevation of a single carriage and matrix mounting means designed according to the invention to form a part of a multiple curing station according to the invention, and shown on an enlarged scale;

FIG. 3 is a view in front elevation of the carriage and the matrix mounting means illustrated in FIG. 2, but shown on a smaller scale;

FIG. 4 is a fragmentary view in front perspective showing one of the pairs of mold matrices as mounted according to the invention in its generally horizontal, open position for the insertion or removal of a tire thereinto or therefrom;

FIG. 5 is a fragmentary side view in elevation, with parts broken away, taken from a position at the left side of FIG. 4 and illustrating the removal of a retreaded pneumatic tire casing from a pair of tire mold matrices, mounted and handled according to the invention;

FIG. 6 is a fragmentary detailed view in perspective, shown on an enlarged scale, illustrating the matrix mounting and hinging means employed with a pair of matrices designed according to the invention;

FIG. 7 is a fragmentary, exploded view in perspective, showing certain parts of the matrix mounting means according to the invention;

FIG. 8 is a fragmentary, sectional view taken along the line 8—8 of FIG. 2 and shown on an enlarged scale;

FIG. 9 is a view illustrating the manner of mounting the tire to be treaded preliminarily to its insertion in a pair of mold matrices designed according to the invention, the view being taken in vertical section and shown on a much smaller scale; and FIG. 10 is a view similar to FIG. 9 but illustrating the tire prepared according to FIG. 9 after it has been inserted in a pair of matrices according to the invention.

A multiple curing station for retreading pneumatic vehicle tires according to the invention is generally indicated in FIG. 1 by the reference number 10 and comprises, among other parts, means forming a plurality of spaced, parallel tracks, in this case, a skeleton framework comprising a front stringer 11, and a rear stringer 12, both of which are welded or otherwise secured at the front and back, respectively, of a plurality of laterally spaced, parallely extending I-beams forming end tracks 13 and intermediate tracks 14. Each of the tracks 13 and 14 cooperates with the adjacent one of the tracks 14 to guide one of a plurality of carriages 15 (see FIGS. 2 and 3). Each of the intermediate tracks 14 functions as two tracks, as can be seen by reference to FIG. 3, with the webs at one side of the "I" functioning to guide, for example, the right side of one carriage 15 and the webs at the other side of the "I" functioning to guide, for example, the left side of a next adjacent carriage 15.

Each of the carriages 15 has a generally rectangular base frame 16 at the front end of which there is erected a forwardly inclined A frame 17 and at the rear of which there is erected a braced strut 18. Short, vertical legs 19 (see FIG. 3) extend downwardly from the corners of the base frame 16 and each of the legs 19 has a roller 20 journalled thereon. The rollers 20 of each of the carriages 15 ride in the pair of tracks 13 and 14 or 14 and 14 associated with that respective carriage and provide for the movement of the carriage back and forth between its front position, best illustrated in FIG. 2 and its rear position, for example, as shown in FIG. 1. Each pair of tracks 13 and 14 or 14 and 14 has a pair of transversely aligned notches 21—21 or 22—22 (FIG. 1) cut through its upper flange to provide for the insertion or removal of the respective carriage 15 therefrom.

A vertical bar 22 (see FIGS. 2, 3, 5 and 7) is erected on top of the A frame 17 extending upwardly to the level of and parallel with the upper portion of the rear vertical strut 18. A bearing collar 23 (FIGS. 5 and 7) is secured near the upper end of the bar 22 and aligned with a bore therein of the same diameter for the reception of a bearing pin 24 set in a quadrant 25 which is, in turn, fastened by machine screws or bolts 26 to an upwardly turned end 27 of a front bar 28 of an open frame 29. The open frame 29 (see FIGS. 1 and 2) is a mounting and support frame for a mold generally indicated at 30 which comprises an upper matrix 31 and a lower matrix 32. At the rear of the open frame 29 there is a rear bar 33 corresponding to the front bar 27 and similarly secured by bolts 34 to a pin plate 35 (see also FIG. 6) which carries a back pivot pin 36. The back pivot pin 36 and the front pivot pin 24 are aligned with each other and the back pivot pin 36 mounts in a circular bore drilled in the upper end of the rear strut 18 so that the entire mold 30 on its open frame 29 is pivotally mounted for swinging on a horizontal axis in the carriage 15.

The quadrant 25 (FIG. 7) has two positioning recesses 37 and 38 cut or drilled in its margins near its ends and located 90° from each other. The recesses 37 and 38 are in line to be engaged by a locking pin 39 secured to the rear of a locking knob 40 carried by the vertical bar 22. The entire mold 30 and its frame 29 may thus be swung from a generally horizontal position such as is illustrated in FIGS. 1, 4 and 5, to a generally vertical position such as is illustrated in FIGS. 2 and 3. The engagement of the locking pin 39 in the recess 37 or 38 locks the mold frame 29 in either its horizontal or vertical position.

The lower matrix 32 is secured to the open frame 29 and the upper matrix 31 is hingedly mounted relative to the lower matrix 32 to provide for its opening in the manner of a clam shell as illustrated in FIGS. 4 and 5. A hinge plate 42 is welded, for example, to the rear bar 33 of the open frame 29 and the upper matrix 31 is removably mounted upon a right angle hinge bracket 43. The two matrices 31 and 32 have corresponding tread design configurations for a tire 41 (see FIG. 8) and are replaceable as a unit with other matrices having different tread designs.

The two matrices 31 and 32 of any particular mold 30 are clamped together in curing position as illustrated in FIG. 8 by the engagement of a clamping ring 44 (see FIGS. 4 and 8 particularly) in similar angular grooves cut in the outer cylindrical walls of the matrices 31 and 32 near their median mating plane. The clamping ring 44 comprises three or four articulated sections 46 on the adjoining ends of which there are mounted two parts of a toggle clamping mechanism generally indicated at 47 and 48. After the two matrices 31 and 32 are swung downwardly from the position illustrated in FIG. 4, for example, to the position illustrated in FIG. 10, i.e., with the two matrices mated together in molding position, the articulated clamping ring 44 is re-engaged with its two grooves 45 and the toggle mechanism 47 and 48 engaged and locked to prevent the separation of the matrices 31 and 32 from each other during the curing portions of the retreading cycle.

Each of the matrices 31 and 32 incorporates means for heating its body in order to apply heat to the uncured rubber constituting the new tread section of the tire 41 being retreaded so that the new rubber of the newly molded tire section will be vulcanized to the body of the tire in question. These heating means are illustrated in the drawings as being adapted for heating by steam and thus comprise annular cores 49 formed in the interior of the matrices 31 and 32 which are connected in series by a line 50 and to steam and return lines 51 and 52. There are flexible lines 51 and 52 for each pair of matrices 31 and 32 which connect the mold 30 formed by the two matrices 31 and 32 to a steam header generally indicated at 53 erected on a stand 54 running along the back of the base frame for the apparatus. The lines 51 and 52 are long enough to provide for constant connection between all of the pairs of matrices 31 and 32 and the steam header 53 so as to continue the application of heat to the matrices 31 and 32 whether they are in the rear, upright, curing position or in the front, horizontal, loading position. By thus maintaining the matrices in constant communication with the heat source the heat loss from the matrices during the periods when they are opened to provide for the insertion and/or removal of tires is greatly minimized.

Referring now additionally to FIGS. 5, 8, 9 and 10, the sequence of operations carried out on apparatus according to the invention for the molding of a retread on a pneumatic tire casing is as follows: After new, uncured rubber, generally indicated by the reference number 55, has been "stitched" onto the tread area of a tire casing 41, it is placed upon a lower flanged spider ring 56 (see FIG. 9) of a bead aligner generally indicated by the reference number 57. The flanged spider ring engages with one of a pair of rim beads 58 of the tire casing 41. The spider ring 56 of the bead aligner 57 may conveniently be supported on a table generally indicated at 59. A curing bag 60, which is similar in its general nature to an inner tube, is inserted into the interior of the casing 41 and backed up by an articulated curing rim 61. After the curing rim 61 is inserted and locked in place, an upper spider ring 62 of the bead aligner 57 is lowered into place on the other one of the rim beads 58 of the casing 41. The upper spider ring 62 is rigidly connected to an air cylinder 63 which has a piston rod 64 terminating in a transverse retaining pin 65. The rod 64 extends freely through an opening at the center of the hub of the upper spider ring 62 and the end of the rod 64 with its retaining pin 65 is engageable through a suitably shaped hole at the center of the hub of the lower spider ring 58 so that by rotating the cylinder 63 and upper spider ring 62 after the lower end of the rod 64 and its pin 65 is thrust through the opening at the hub of the lower spider ring 58, the pin 65 can be positioned beneath the face of the hub of the lower spider ring 58. Air is then admitted into the cylinder 63 of the bead aligner 57 which causes its rod 64 to be pulled into the cylinder as illustrated in FIG. 10. This pulls the two spider rings 56 and 62 towards each other pulling the rim beads 58 of the tire 41 radially inwardly over the curing rim 61 and reducing the outside diameter of the tire casing 41 to a diameter substantially smaller than its relaxed outside diameter. This provides for the insertion of the tire casing 41 into the mold formed by the matrices 31 and 32 without the necessity for forcing. It must be remembered that at this point in the process, the new layer of rubber on the tread section of the casing 41 is still soft but that the portions of the matrices 31 and 32 which are to form the grooves in the newly molded tread protrude inwardly to such a distance as to render the insertion of the tire at its normal relaxed diameter very difficult. After the tire casing 41 clamped by the bead aligner 57 in the position indicated in FIG. 10 is inserted into the lower matrix 32, the matrices 31 and 32 are closed and clamped together. Air may then be released from the cylinder 57 allowing its two spider rings 56 and 62 to separate axially while air is being flowed from a suitable line into the curing bag 60.

As the spider rings 56 and 62 of the bead aligner 57 separate from each other, the rim beads 58 of the tire 41 also separate from each other due to their natural resiliency and due to the build up of the pressure in the curing bag 60, to the normal position illustrated in section in FIG. 8. The pin 65 on the rod 64 of the bead aligner 57 is then disengaged from the lower spider ring 56 and the bead aligner 57 removed. The clamped-up pair of matrices 31 and 32 forming the mold 30 are then ready to be rotated again on their horizontal pivot line into the upright position and to have their carriage 15 pushed to the rear part of their respective set of tracks 13—14 or 14—14.

During the loading of a mold 30 as just discussed, its respective carriage 15 is at the front part of the multiple curing station and it is held in this position by the engagement of a gravity actuated latch 66 (see FIG. 1) over the edge of the respective one of the rails 14. The latch 66 may be disengaged manually by pulling on a latch chain 67 which extends upwardly and is connected at its upper end to a keeper ring 68 secured near the top of the front vertical bar 22. Similarly, when the carriage 15 is in its rear position (see FIG. 1) its latch bar 66 is engaged with a stop 69 on the proper track 13 or 14 at the position to retain the respective carriage 15 at the back of the station.

During the curing portion of the retreading cycle, heat softens the uncured rubber 55 and pressure within the curing bag 60 forces the casing 41 to expand and squeezes the uncured rubber 55 into the configurations of the mold formed by the upper and lower matrices 31 and 32. Continued heat applied to the matrices 31 and 32 cures the rubber in this molded condition. After the expiration of the fifty or fifty-five minute curing cycle, the particular mold 30 on its carriage 15 is again pulled to the front position illustrated in FIGS. 1 and 5, the clamping ring 44 opened and preparations made for removing the retreated tire casing 41. Because of the intimate engagement between the now cured rubber of the tread section of the tire casing 41 with the configurations on the interior of the matrices 31 and 32 it is often necessary to apply power to the upper matrix 31 in order to separate the matrices 31 and 32 and often to the tire casing 41, itself, in order to remove it from the lower matrix 32. To this end the upper matrix 31 (see FIG. 5) is provided with an eye 70 in which the hook 71 of a chain fall may readily be engaged to pull the matrix 31 upwardly. Usually because of the swinging action of the matrix 31 when it is opened, the tread rubber of the tire casing 41 is stripped away from the convolutions on the interior of the upper matrix 31. However, because of the intimate engagement mentioned, the tire 41 is likely to be retained in the lower matrix 32. In order to insure the separation of the tire 41 from the lower matrix 32, during the opening of the matrices, a tire hook 72 (FIG. 5) may be employed. The upper end of the tire hook 72 is engaged in a pocket 73 attached to the upper matrix 31 near the eye 70 and the lower end of the tire hook 72 inserted into the interior of the casing 41 so that it engages with the uppermost one of the rim beads 58 of the tire casing 41. When power is applied through the chain fall 71 to the upper matrix 31, it begins to swing upwardly stripping the tire casing 41 out of its convolutions and, as soon as the lower end of the tire hook 72 engages the rim bead 58 of the casing 41, power is transferred directly to the casing 41 for stripping it out of the convolutions of the lower matrix 32.

It is important to note that all during the portions of the cycle when a cured tire 41 is being removed from the matrices 31 and 32 or when a tire to be cured is being inserted thereinto, the matrices 31 and 32 remain connected to the steam lines so that the matrices do not cool down to a very great extent. This expedites the curing operations and shortens the cycle because it is not necessary to reheat the matrices for each curing operation. Of course, the matrices may be heated by electrical heating units instead of the steam lines disclosed in the drawings, the selection of a particular means for heating the matrices being determined not by any inventive concept herein contained but by the type of facility available at the particular shop in question.

Having described my invention, I claim:

1. A multiple curing station for retreading pneumatic vehicle tires, said station comprising means forming a plurality of closely spaced, parallel pairs of parallel tracks, mold carriages mounted on and guided by said pairs of tracks, a pair of opposed, cooperating, circular mold matrices for each of said carriages, cooperating trunnion and bearing means on each of said carriages and pairs of matrices for mounting said pairs of matrices for pivotal movement on a front-to-back horizontal axis between a generally vertical position with the axis of the tire being retreaded extending generally horizontally and a generally horizontal position with the axis of said tire extending generally vertically, hinge means at the rear of each of said pairs of matrices for angular opening thereof for insertion and removal of a tire being retreaded the overall width of each of said carriages being greater than the axial thickness of said pair of mold matrices mounted thereon, and being substantially less than the diameter of said pairs of mold matrices, adjacent pairs of said tracks being spaced a distance sufficient for side-by-side array of said carriages when said pairs of matrices are in generally vertical position but a distance insufficient for such array when adjacent ones of said pairs of matrices are in generally horizontal position, each of said carriages being independently movable back and forth on its associated pair of tracks, and heating means for said pairs of mold matrices, whereby each of said carriages is movable to one end of the travel thereof and the associated pair of matrices movable to horizontal position for removal or insertion of a tire while the others of said carriages rest at the other end of the travel thereof in side-by-side array for curing tires therein.

2. A multiple curing station for retreading pneumatic vehicle tires, said station comprising, means forming a plurality of spaced, parallel tracks, a mold carriage mounted on and guided by each adjacent pair of tracks formed thereby, a pair of opposed, cooperating, circular mold matrices mounted on each of said carriages, means on each of said carriages for mounting said pair of matrices for rotative movement on a horizontal front-to-rear axis between a generally vertically position with the axis of the tire being retreaded extending generally horizontally and a generally horizontal position with the axis of said tire extending generally vertically, a hinge connecting said pair of matrices at the rear thereof for opening said pair of matrices for insertion and removal of a tire being retreaded, the overall width of said carriage and the pair of mold matrices mounted thereon when in generally vertical position being substantially less than the diameters of said pairs of mold matrices, and adjacent pairs of said tracks being spaced a distance sufficient for side-by-side array of said carriages when said pairs of matrices are in generally vertical position but a distance insufficient for such array when adjacent ones of said pairs of matrices are in generally horizontal position, each of said carriages being independently movable back and forth on its associated pair of tracks, and heatof said carriages is movable to one end of the traveling means for said pairs of mold matrices whereby each thereof and the associated pair of matrices rotatable to horizontal position for removal or insertion of a tire while the others of said carriages rest at the other end of the travel thereof in side-by-side array for curing tires therein.

3. A multiple curing station according to claim 2 and latch means for releasably retaining each of said carriages at front and back position.

References Cited in the file of this patent

UNITED STATES PATENTS

| | | |
|---|---|---|
| 1,840,490 | Denmire | Jan. 12, 1932 |
| 2,111,233 | Zange | Mar. 15, 1938 |
| 2,315,934 | Chambers | Apr. 6, 1943 |
| 2,654,910 | McDonald | Oct. 13, 1953 |
| 2,948,924 | Clapp | Aug. 16, 1960 |

FOREIGN PATENTS

| | | |
|---|---|---|
| 608,503 | Canada | Nov. 8, 1960 |